US008325599B2

(12) United States Patent
Matsumoto et al.

(10) Patent No.: US 8,325,599 B2
(45) Date of Patent: Dec. 4, 2012

(54) COMMUNICATION SYSTEM AND COMMUNICATION METHOD

(75) Inventors: Tadashi Matsumoto, Osaka (JP); Makoto Nishikawa, Kadoma (JP); Shoji Koise, Fukuoka (JP); Masayuki Amano, Kadoma (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 12/532,457

(22) PCT Filed: Mar. 19, 2008

(86) PCT No.: PCT/JP2008/055109
§ 371 (c)(1),
(2), (4) Date: Sep. 22, 2009

(87) PCT Pub. No.: WO2008/117722

PCT Pub. Date: Oct. 2, 2008

(65) Prior Publication Data

US 2010/0118887 A1 May 13, 2010

(30) Foreign Application Priority Data

Mar. 23, 2007 (JP) ................................ 2007-077363
Jun. 15, 2007 (JP) ................................ 2007-159371

(51) Int. Cl.
*H04J 3/16* (2006.01)
(52) U.S. Cl. ......... 370/229; 370/255; 370/406; 370/529
(58) Field of Classification Search .................. 370/229, 370/230, 235, 255, 445, 465, 466, 468, 469, 370/529
See application file for complete search history.

(56) References Cited

U.S. PATENT DOCUMENTS

| 6,775,285 | B1 * | 8/2004 | Moles et al. ................ 370/392 |
| 7,412,550 | B2 * | 8/2008 | Joe et al. ........................ 710/110 |
| 2005/0204084 | A1 | 9/2005 | Joe et al. |

FOREIGN PATENT DOCUMENTS

| GB | 2 236 933 A | 4/1991 |
| JP | 3-174842 A | 7/1991 |
| JP | 4-123692 A | 4/1992 |
| JP | 8-274742 A | 10/1996 |
| JP | 2005-73075 A | 3/2005 |

OTHER PUBLICATIONS

International Search Report for the Application No. PCT/JP2008/055109 mailed May 20, 2008.
Notice to Submit a Response for the Application No. 10-2009-7021051 from Korean Intellectual Property Office dated Sep. 30, 2011.

* cited by examiner

*Primary Examiner* — Yemane Mesfin
*Assistant Examiner* — Mon Cheri Davenport
(74) *Attorney, Agent, or Firm* — Cheng Law Group, PLLC

(57) ABSTRACT

A communication device 1 has a first protocol analysis section 11 that analyzes a status of a transmission signal Vs received at a transmission signal receiver 10. A transmission controller 14 determines a communication available period and a communication unavailable period based upon the analysis result. When the communication available period is determined, the transmission controller 14 allows a second protocol signal transmitter 12 to transmit a packet in accordance with a second protocol to a signal line Ls. With this result, it is possible to transmit a relatively large amount of data while suppressing noise influence caused by a varying condition of a carrier, in contrast to a prior system in which the transmission signal is superimposed only by a simple determination of the carrier condition. Thus, it is possible to share the signal line Ls with the time-division multiplexing transmission system and improve reliability of data transmission.

14 Claims, 8 Drawing Sheets

COMMUNICATION SYSTEM AND COMMUNICATION METHOD

TECHNICAL FIELD

The present invention is directed to a communication system and a communication method which are adapted in use to share a signal path line with an existing time-division multiplexing transmission system.

BACKGROUND ART

It has been proposed a prior art time-division multiplexing communication system, for example, as disclosed in JP2005-73075 A in which one or more slaves are connected in parallel with each other to a master by way of a two-wire signal line. The time-division multiplexing transmission system is provided for data transmission between the master and the slaves.

One example of the time-division multiplexing transmission system is proposed in a remote monitoring and controlling system as shown in FIG. 11. The remote monitoring and controlling system includes a transmission unit 21 as the master connected through the two-wire signal line Ls to an input terminal 22 and control terminals 23 collectively referred to as the slave. The remote monitoring and controlling system is provided to control loads L connected respectively to the control terminals 23 in accordance with monitoring inputs from a switch or sensor associated with the input terminal 22. The input terminal 22 and the control terminals 23 are given respectively with individual addresses.

The transmission unit 21 normally operates to cyclically vary an address data included in the transmission signal Vs to make constant polling to the input terminal 22 and the control terminals 23 sequentially. When receiving the monitoring input, the input terminal 22 transmits a monitoring data corresponding to the monitored input to the transmission unit 21. Upon reception of the monitoring data, the transmission unit 21 responds to transmit a control data corresponding to the monitored data to the control terminal 23 associated with the input terminal 22 by means of the address, in order to control the load L through the control terminal 23. A switch or sensor equivalent to the switch may be utilized to give the monitored input to the input terminal 22. Hereinafter, an explanation is made with a case in which the switch is utilized to give the monitored input to the input terminal 22. That is, the monitored input is generated in response to a manipulation of the switch, thus the monitored input is referred to as the manipulation input.

Incidentally, in a time-division multiplexing transmission system such as that described above, the slaves (the input terminal 22 and control terminals 23) communicate with each other via the master (the transmission unit 21) in accordance with a protocol of the polling/selecting system (to be referred to hereafter as a first protocol). Hence, a communication speed is comparatively low, and therefore this system is ill suited to the transmission of data having a much greater volume than monitoring data or control data such as an electric energy measurement value or a telephone call voice, for example.

Therefore, a communication system and communication method in which high-speed communication is performed while sharing a signal line Ls with a time-division multiplexing transmission system by modulating a voice signal and superimposing it onto a transmission signal Vs has been proposed (see JP H08-274742 A, for example). In the conventional example described in JP H08-274742 A, the voice signal is superimposed only during a period in which a series of pulses serving as a carrier is stable at a high level and a low level in order to avoid the effects of noise (harmonic noise) generated on a rising edge and a falling edge of the transmission signal Vs.

However, when the period in which the carrier (the series of pulses) of the time-division multiplexing transmission system is stable at a high level and a low level is set as a communication period for high-speed communication, as in the conventional example described in JP H08-274742 A, the communication period may be extremely short, depending on the condition of the transmission signal Vs (the transmission condition of the first protocol), and therefore this system may be unsuitable for transmitting a high-speed communication signal. When data transmission is performed during a period that is unsuitable for signal transmission, the noise that is generated on the rising edge and the falling edge of the carrier is more likely to have an effect, possibly leading to a reduction in the reliability of the data transmission.

DISCLOSURE OF THE INVENTION

The present invention has been designed in consideration of the circumstances described above, and an object thereof is to provide a communication system and a communication method for improving the reliability of data transmission while sharing a signal line with a time-division multiplexing transmission system.

To achieve the object described above, a communication system according to the present invention is a communication system that shares a signal line with a time-division multiplexing transmission system. In the time-division multiplexing transmission system, one or more slaves are connected in parallel to a master by way of a two-wire signal line, and both data transmission from the master to a slave and data transmission from a slave to the master are performed in time division in accordance with a first protocol.

The communication system includes a plurality of communication devices connected in parallel with each other to the signal line. Each communication device includes: transmission signal receiving means configured to receive a transmission signal transmitted between the master and the slave in accordance with the first protocol in the time-division multiplexing system; transmitting means configured to provide a packet to be superimposed on the transmission signal and transmit the packet in accordance with a second protocol different from the first protocol, the packet including data to be transmitted to the other communication device; receiving means configured to receive the packet transmitted through the signal line from the other communication device in accordance with the second protocol; and control means configured to permit the transmitting means to transmit the packet. The communication device also includes first protocol analysis means configured to analyze the transmission signal transmitted in accordance with the first protocol and received at the transmission signal receiving means to give a first protocol data transmission status.

The communication device determines whether or not the first protocol data transmission status analyzed at the first protocol analysis means is available for transmitting the packet in accordance with the second protocol, and permits the transmitting means to transmit the packet when the status is determined to be available.

According to this constitution, when the first protocol transmission signal, which is transmitted between the master and slave of the time-division multiplexing transmission system, is received by the receiving means and the transmission condition of the first protocol data is analyzed by the first protocol analysis means from the received transmission signal, a determination is made as to whether or not the analyzed transmission condition of the first protocol data is suitable for transmitting a packet in accordance with the second protocol. When it is determined that the condition is suitable for transmission, a packet including data is superimposed on the transmission signal, which is transmitted from the transmitting means in accordance with the second protocol different from the first protocol. Hence, in comparison with a conventional example in which a signal is superimposed on a transmission signal after simply determining a waveform, a relatively large volume of data can be transmitted while suppressing the effects of noise generated by variation in the condition of the transmission signal and a transient response generated by voltage inversion in the signal. As a result, a communication system in which the reliability of data transmission is improved while sharing a signal line with a time-division multiplexing transmission system can be provided.

More preferably, the control means is configured to permit the transmitting means to transmit said packet in accordance with said second protocol after a predetermined waiting time period from a rising or falling edge of said transmission signal composed of a series of pulses. According to this constitution, noise generated on the rising edge and falling edge of the transmission signal is less likely to have an effect, and therefore the reliability of the data transmission can be improved even further.

More preferably, the transmitting means is configured to transmit the packet, which is obtained by modulation of a carrier by data, so as to be superimposed on the transmission signal, and the receiving means is configured to receive the packet superimposed on the transmission signal, demodulate the data from the packet, and detect whether or not the carrier is superimposed on the transmission signal. The transmitting means is configured to transmit the packet immediately upon non-detection of the carrier at the receiving means and to transmit the packet after a predetermined time period upon detection of the carrier. The control means is configured to permit the transmitting means to transmit the carrier to be superimposed on the transmission signal within the waiting time period during the data transmission of the packet is made in accordance with the second protocol. According to this constitution, the communication device in which communication is underway superimposes the carrier on the transmission signal during the waiting time period, and since the carrier is superimposed on the transmission signal, the other communication device, which is about to begin a new communication, does not begin the communication. As a result, a communication collision can be avoided.

More preferably, the control means is configured to permit the transmitting means to transmit the packet in accordance with the second protocol after an elapse of a second waiting time period which is longer than the waiting time period, until the data transmission in accordance with the second protocol is started. According to this constitution, even when the other communication device in which communication is underway cannot detect the second carrier superimposed on the transmission signal, a new communication is not begun until the second waiting time period has elapsed, and therefore a communication collision can be avoided reliably.

More preferably, the control means is configured to permit the transmitting means to transmit the packet including an invalid data in synchronization with such a timing that the data transmission becomes unavailable for transmission of the packet, in case when the length of the packet is longer than a period available for transmission of the packet in accordance with the second protocol during the data transmission with the first protocol. According to this constitution, packets can be transmitted on either side of a period in which the transmission condition of the first protocol data is not suitable for packet transmission, and as a result, the number of packets required to transmit the data can be reduced, enabling an improvement in communication efficiency.

In another aspect, the control means is configured to predict, when the transmitting means transmits consecutively a plurality of the packets corresponding respectively to the data divided from one message, a situation where a period in which the data transmission with the first protocol becomes unavailable for the packet transmission with the second protocol exists between the packets and at the same time a transmission interval including the period becomes longer than a predetermined timeout period, and to delay a timing of transmitting the last packet before thus predicted situation occurs. According to this constitution, the likelihood that a reception interval between packets will exceed the timeout period in the reception side communication device can be reduced, enabling an improvement in data transmission efficiency.

More preferably, the first protocol is configured to define an interrupt request period in which an interrupt signal of requesting to start the data transmission from the slave to the master is transmitted, and a preference period in which the slave making the interrupt request is preferentially allowed to make the data transmission. The communication device includes an interrupt signal transmission means for transmitting the interrupt signal by way of the signal line. The control means is configured to cause the interrupt signal transmission means to issue the interrupt signal, and thereafter to cause the transmitting means to transmit the packet in accordance with the second protocol preferentially in the preference period. According to this constitution, the interrupt signal defined by the first protocol is transmitted from the interrupt signal transmission means to the master via the signal line, and once the interrupt signal has been transmitted, the second protocol packet is transmitted during the preference period of the first protocol corresponding to the interrupt signal. Therefore, the second protocol packet can be transmitted reliably and quickly.

In another aspect, the first protocol may be configured to define a command transmission period in which the master sends a data transmission requesting command for requesting the slave to transmit the data, and a data transmission period in which the requested slave makes the data transmission in response to the command. The control means is configured to cause the transmitting means to transmit the packet in accordance with the second protocol when it is determined that no the date transmission requesting command is transmitted during the command transmission period based upon an analysis result made at the first protocol analysis means. According to this constitution, it is possible to extend the period during which the second protocol packet can be transmitted.

More preferably, the communication device includes a mode selector for setting a second protocol exclusive mode when the transmission signal in accordance with the first protocol is not received over a predetermined time period. The control means is configured to permit the transmitting means to transmit the packet without determining whether or not the packet transmission in accordance with the second protocol is available when the second protocol exclusive mode is selected at the mode selector. According to this constitution, the communication system can be shifted automatically to a system for communicating using the second protocol alone without replacing the communication device.

To achieve the above object, a communication method according to the present invention is a communication method in which a signal line is shared with a time-division multiplexing transmission system. In the time-division multiplexing transmission system, one or more slaves are connected in parallel to a master by way of a two-wire signal line, and both data transmission from the master to a slave and data transmission from a slave to the master are performed in time division in accordance with a first protocol.

The communication method includes receiving a transmission signal transmitted between the master and the slave of the time-division multiplexing transmission system in accordance with the first protocol using a plurality of communication devices connected in parallel with each other to the signal line, and analyzing the received transmission signal to give a first protocol data transmission status with regard to the first protocol. Further, the communication method includes determining whether or not the first protocol data transmission status is available for transmission of a packet in accordance with a second protocol, and transmitting the packet as being superimposed on the transmission signal from one of the communication devices to the other communication device in accordance with the second protocol different from the first protocol when the first protocol data transmission status is determined to be available for transmission of the packet, the packet including data to be transmitted from one of the communication devices to the other one.

According to this method, when the transmission signal according to the first protocol, which is transmitted between the master and slave of the time-division multiplexing transmission system, is received by the receiving means and the transmission condition of the first protocol data is analyzed by the first protocol analysis means from the received transmission signal, a determination is made as to whether or not the analyzed transmission condition of the first protocol data is suitable for transmitting a packet in accordance with the second protocol. When it is determined that the condition is suitable for transmission, a packet including data is superimposed on the transmission signal, which is transmitted from the transmitting means in accordance with the second protocol different from the first protocol. Hence, in comparison with a conventional example in which a signal is superimposed on a transmission signal after simply determining a waveform, a relatively large volume of data can be transmitted while suppressing the effects of noise generated by variation in the condition of the transmission signal. As a result, a communication method in which the reliability of data transmission is improved while sharing a signal line with a time-division multiplexing transmission system can be provided.

BRIEF DESCRIPTION OF THE DRAWINGS

FIG. 12 is a view showing a signal format of a transmission signal in a time-division multiplexing transmission system.

BEST MODE FOR CARRYING OUT THE INVENTION

Embodiments in which the technical spirit of the present invention is applied to the communication system sharing a signal line Ls with a time-division multiplexing transmission system (remote monitoring and controlling system) described in the related art will be described below. Note, however, that the time-division multiplexing transmission system with which the communication system according to the present invention can share a signal line is not limited to the time-division multiplexing transmission system of these embodiments.

First Embodiment

Figure 1A:
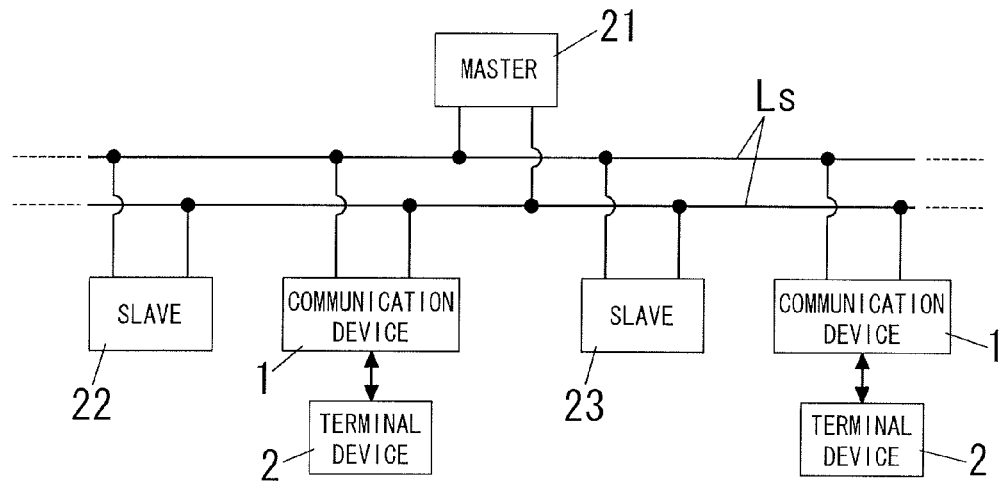
FIG. 1 shows a first embodiment of the present invention, FIG. 1A being an overall system diagram and FIG. 1B being a block diagram of a communication device.

FIG. 1A shows the system constitution of a communication system according to this embodiment and a time-division multiplexing transmission system that shares a signal line Ls with the communication system. In the time-division multiplexing transmission system, a plurality of slaves (an input terminal 22 and a control terminal 23) are connected in parallel with each other to a master (a transmission unit) 21 by a two-wire signal line Ls such that a transmission signal Vs shown in FIGS. 12A and 12B is subjected to time-division multiplexing transmission between the master 21 and the slaves 22, 23.

The master (transmission unit) 21 transmits a transmission signal Vs having a format shown in FIGS. 12A and 12B onto the signal line Ls. More specifically, the transmission signal Vs is a bipolar (±24V) time-division multiplexed signal. The transmission signal Vs is constituted by a start pulse SY indicating the start of signal transmission, mode data MD indicating a mode of the transmission signal Vs, address data AD for calling up the input terminal 22 and the control terminal 23 individually, control data CD for controlling a load, check sum data CS for detecting a transmission error, and a signal return period WT, which is a time slot for receiving a return signal from the input terminal 22 or the control terminal 23. In the time-division multiplexing transmission system according to this embodiment, data are transmitted using a transmission signal Vs formed by subjecting a carrier constituted by a series of pulses to pulse width modulation.

When the address data of a transmission signal Vs received by one of the input terminals 22 and control terminal 23 via the signal line Ls matches address data (individual address data) set therein, the control data is downloaded from the transmission signal Vs, and monitoring data is returned as a current mode signal (a signal transmitted by short-circuiting the signal line Ls via an appropriate low impedance) in synchronization with the signal return period WT of the transmission signal Vs. Further, power for an interior circuit of the input terminal 22 and control terminal 23 is supplied by stabilizing the transmission signal Vs transmitted via the signal line Ls through rectification.

The master 21 performs continuous polling in which the address data included in the transmission signal Vs is continuously varied cyclically so that the input terminal 22 and control terminal 23 are accessed sequentially. During continuous polling, when control data is included in the transmission signal Vs, the control data is downloaded by the input terminal 22 or control terminal 23 that matches the address data included in the transmission signal Vs, whereupon an operating condition of the input terminal 22 or control terminal 23 is returned to the master 21 as the monitoring data.

The master 21 also performs interrupt polling upon reception of an interrupt signal Si such as that shown in FIG. 12C, which is generated in one of the input terminals 22 in response to an operation input from a switch, to detect the input terminal 22 that generated the interrupt signal Si and then access the input terminal 22 to cause the terminal to return monitoring data corresponding to the operation input. Note that the interrupt signal Si is generated during a part of the period of the start pulse SY (in FIG. 12, the first half period of the start pulse SY).

More specifically, the master 21 performs continuous polling continuously to transmit a transmission signal Vs in which the address data is modified cyclically onto the signal line Ls. Then, when the master 21 detects an interrupt signal Si generated from the input terminal 22 in synchronization with the start pulse SY of the transmission signal Vs, a transmission signal Vs in which the mode data MD is set to an interrupt polling mode is transmitted from the transmission unit 21. When the input terminal 22 that generated the interrupt signal Si matches higher-order bits of the address data of the transmission signal Vs set in the interrupt polling mode, lower-order bits of the address data set in the input terminal 22 are returned in synchronization with the signal return period WT of the transmission signal Vs as reply data. Thus, the transmission unit 21 acquires the address of the input terminal 22 that generated the interrupt signal Si.

When the transmission unit 21 acquires the address of the input terminal 22 that generated the interrupt signal Si, the master 21 transmits a transmission signal Vs requesting the return of monitoring data to the input terminal 22. The input terminal 22 returns monitoring data corresponding to the operation input to the master 21. Upon reception of the monitoring data, the master 21 issues an instruction to clear the operation input of the corresponding input terminal 22. The input terminal 22 then returns information indicating clearance of the operation input. In other words, the master 21 receives the operation input by means of four transmission signals Vs, including the transmission signal Vs for detecting the interrupt signal Si.

Having received the monitoring data, the master 21 generates control data relating to the control terminal 23 that is pre-associated with the input terminal 22 in accordance with an address correspondence relationship, and controls a load L applied to the control terminal 23 by transmitting a transmission signal Vs including the control data onto the signal line Ls.

The communication system according to this embodiment is constituted by a plurality of (two in the illustrated example) communication devices 1, 1 connected in parallel with each other to the signal line Ls, and terminal devices 2, 2 that output transmission data to the respective communication devices 1, 1 and input reception data from the communication devices 1, 1. In other words, the communication devices 1, 1 perform communication (data transmission) via the signal line Ls, while the terminal devices 2, 2 generate data to be transmitted and process received data. Note that the terminal devices 2, 2 may be realized using a typical computer device or the like, and therefore detailed description of the constitution and operations thereof has been omitted.

Figure 1B:
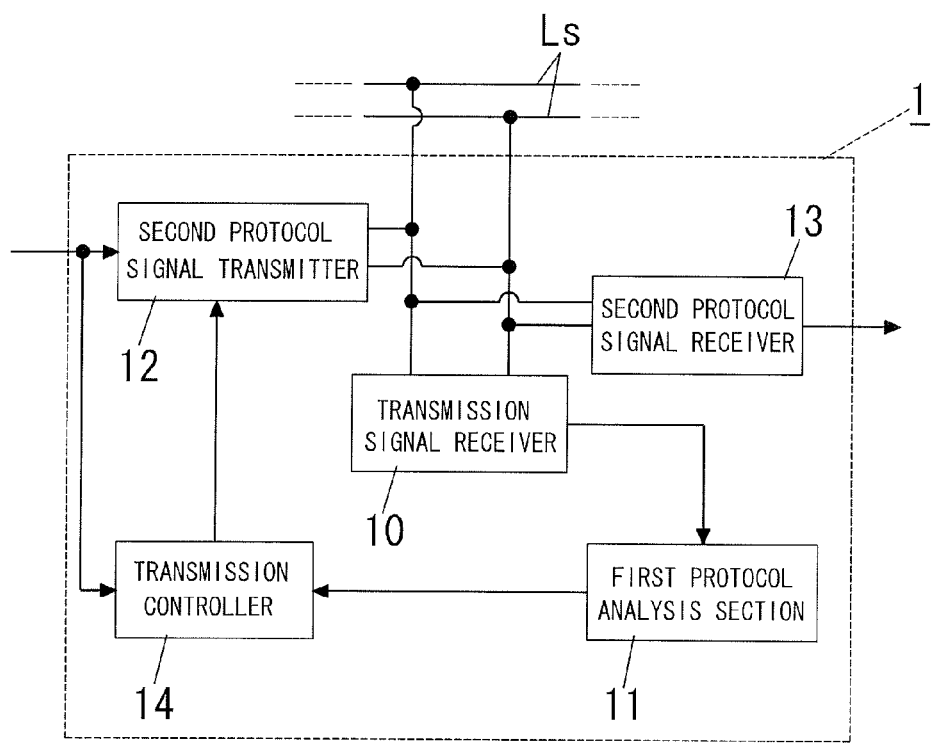

As shown in FIG. 1B, the communication device 1 includes a transmission signal receiver 10 that receives a transmission signal Vs transmitted between the master 21 and slaves 22, 23 of the time-division multiplexing transmission system in accordance with the first protocol, and a first protocol analysis section 11 that analyzes the transmission signal Vs transmitted in accordance with the first protocol and received at the transmission signal receiver 10 to give a first protocol data transmission status (to be referred to hereafter as a "state"). The communication device 1 also includes a second protocol signal transmitter 12 that provides a packet to be superimposed on the transmission signal Vs and transmits the packet in accordance with a second protocol, which is different to the first protocol, the packet including data to be transmitted to the other communication device 1, and a second protocol signal receiver 13 that receives the packet transmitted by the other communication device 1 in accordance with the second protocol from the signal line Ls. The communication device 1 also includes a transmission controller 14 that determines whether or not the state analyzed by the first protocol analysis section 11 is suitable for transmitting a second protocol packet and allows the second protocol signal transmitter 12 to transmit the packet after determining that the state is suitable for transmission. Note that power is supplied to the respective sections using either a method (to be referred to hereafter as a "concentrated power supply method") in which the transmission signal Vs transmitted from the master (transmission unit) 21 via the signal line Ls is stabilized through rectification, similarly to the slaves (the input terminal 22 and control terminal 23) of the time-division multiplexing transmission system, or a method (to be referred to hereafter as a "local power supply method") in which power is supplied by stabilizing a commercial power supply through rectification.

As described above, in the first protocol used by the time-division multiplexing transmission system, a transmission signal Vs formed by subjecting a carrier constituted by a series of pulses to pulse width modulation is transmitted. When a second protocol packet is superimposed onto the transmission signal Vs, the superimposing operation is preferably performed during a period in which the transmission signal Vs is stable at a high level or a low level. The transmission signal Vs has a signal format such as that shown in FIGS. 12A and 12B. In the period of the start pulse SY and the signal return period WT, the period in which the transmission signal Vs is stable at the high level or the low level is relatively long, and therefore these periods (to be referred to as communication suitable periods hereafter) are considered suitable for transmitting a superimposed packet. However, in the period from the mode data MD to the check sum data CS, the period in which the transmission signal Vs is stable at the high level or the low level is considerably shorter in relative terms, and therefore this period (to be referred to as a communication unsuitable period hereafter) is considered unsuitable for transmitting a superimposed packet. Further, during the periods of the rising and falling edges of the series of pulses, harmonic noise is superimposed onto the transmission signal Vs, and therefore these periods may also be considered as communication unsuitable periods.

Hence, in the communication device 1 of this embodiment, the state (the respective periods of the start pulse SY, the mode data MD, the address data AD, the control data CD, and the check sum data CS as well as the signal return period WT) of the transmission signal Vs received by the transmission signal receiver 10 is analyzed in the first protocol analysis section 11. More specifically, the first protocol analysis section 11 counts pulses having a pulse width of no more than a predetermined time period. Then, after detecting a period in which the level of the transmission signal Vs does not vary for at least the predetermined time period, the first protocol analysis section 11 recognizes the start of the signal return period WT from the period in which the level does not vary. For example, when the pulse width of a pulse indicating "0" is set at 125 microseconds and the pulse width of a pulse indicating "1" is set at 250 microseconds in the mode data MD, address data AD, control data CD, and check sum data CS, and the aforementioned predetermined time period is set at 350 microseconds, i.e. longer than the aforementioned pulse widths, the first protocol analysis section 11 recognizes the signal return period WT when it detects a period in which the level of the transmission signal Vs does not vary for 350 microseconds or longer after counting at least 28 consecutive pulses having a pulse width of 350 microseconds or less. Thus, the first protocol analysis section 11 can analyze the state of the transmission signal Vs.

The transmission controller 14 differentiates between the communication suitable periods and the communication unsuitable periods on the basis of the analysis result of the first protocol analysis section 11 (the state of the transmission signal Vs). In other words, the transmission controller 14 recognizes the period of the start pulse SY and the signal return period WT of the transmission signal Vs as communication suitable periods. The transmission controller 14 also recognizes a rest period between one transmission signal Vs and the next transmission signal Vs as a communication suitable period. Once it has determined a communication suitable period, the transmission controller 14 allows the second protocol signal transmitter 12 to transmit a second protocol packet onto the signal line Ls.

Depending on the transmission signal Vs, an end pulse, which is a similar pulse array to the start pulse SY, may be provided after the signal return period WT. In this type of transmission signal Vs, the transmission controller 14 may recognize the period of the end pulse as a communication suitable period. On the other hand, the transmission controller 14 may recognize a period in which the interrupt signal Si or return data is likely to be generated (for example, the first half period of the start pulse SY in FIG. 12 or the like) as a communication unsuitable period rather than a communication suitable period even if the period coincides with the period of the start pulse SY, the signal return period WT, or the period of the end pulse.

Figure 2:
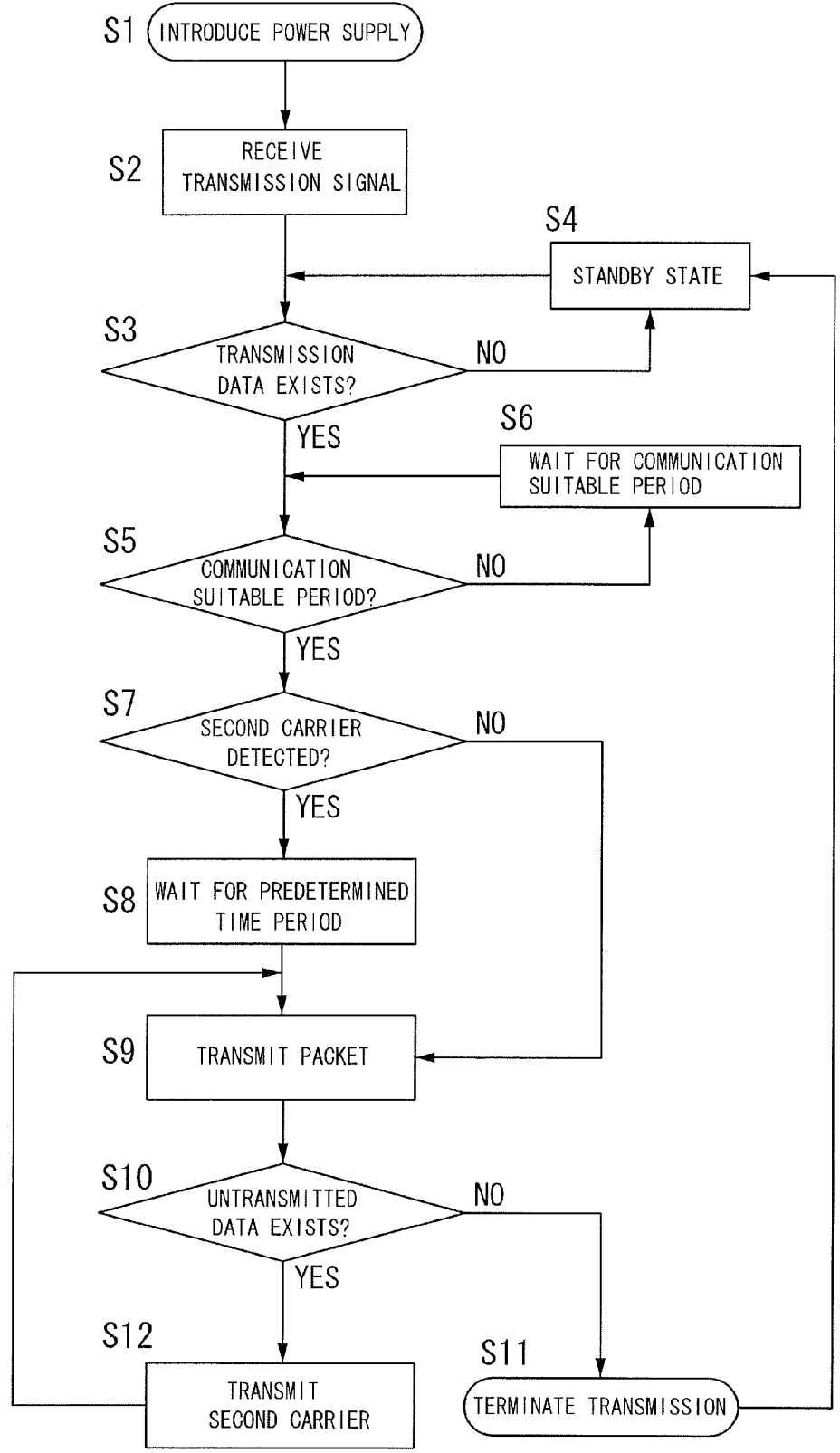
FIG. 2 is a flowchart illustrating an operation of the communication device according to the first embodiment.

Next, referring to a flowchart shown in FIG. 2, an operation of the communication device 1 will be described in detail.

First, when a power supply is introduced such that the communication device 1 is activated (step S1), the transmission signal receiver 10 receives a transmission signal Vs from the signal line Ls (step S2). The transmission controller 14 determines whether or not transmission data has been input from the terminal device 2 (step S3), and when no transmission data has been input, the routine enters a standby state in which the transmission signal receiver 10 remains in a receptive condition (step S4). When transmission data exists, on the other hand, the transmission signal Vs received by the transmission signal receiver 10 is analyzed by the first protocol analysis section 11, whereupon the transmission controller 14 differentiates between the communication suitable periods and communication unsuitable periods on the basis of the analysis result (step S5). When the transmission controller 14 determines that a communication unsuitable period is currently established, the routine enters a standby state until a communication suitable period is established (step S6), and when it is determined that a communication suitable period is established, the transmission controller 14 allows the second protocol signal receiver 13 to detect a carrier (a second carrier) used for packet transmission in accordance with the second protocol (step S7). When the second protocol signal receiver 13 detects the second carrier, the transmission controller 14 waits for a predetermined time period (step S8), and then permits the second protocol signal transmitter 12 to transmit a second protocol packet onto the signal line Ls (step S9). When the second protocol signal receiver 13 does not detect the second carrier, the transmission controller 14 causes the second protocol signal transmitter 12 to transmit a second protocol packet onto the signal line Ls without waiting for the predetermined time period (steps S8, S9). Note, however, that immediately after a variation in the state of the transmission signal Vs (immediately after the rising and falling edges of the transmission signal Vs), harmonic noise is highly likely to be superimposed thereon, and therefore, even when the second carrier is not detected, the second protocol packet is transmitted after the elapse of a sufficient amount of time period (to be referred to hereafter as a waiting time period) to ensure that the harmonic noise attenuates.

Here, when the data volume of the transmission data is large, it may be impossible to transmit all of the data in one communication suitable period. Therefore, the transmission controller 14 determines whether or not untransmitted data exists (step S10), and when no untransmitted data remains, the transmission controller 14 terminates packet transmission according to the second protocol packet (step S11) and waits for new transmission data to be input from the terminal device 2 (step S4). When untransmitted data remains, on the other hand, the remaining data is transmitted in the next communication suitable period following a communication unsuitable period or a period in which the state varies (the periods of the rising and falling edges of the transmission signal Vs). However, if the other communication device 1 transmits a second protocol packet during the next communication suitable period, the packets may collide, making normal transmission impossible. Hence, when untransmitted data remains, the transmission controller 14 determines the next communication suitable period from the analysis result of the first protocol analysis section 11, permits the second protocol signal transmitter 12 to transmit the second carrier onto the signal line Ls first (step S12), and then permits the second protocol signal transmitter 12 to transmit the second protocol packet onto the signal line Ls (step S9). When the second carrier is transmitted onto the signal line Ls before the packet for transmitting the untransmitted data in this manner, the other communication device 1 that is about to begin packet transmission detects the second carrier immediately after the start of the communication suitable period, and therefore halts packet transmission. As a result, a situation in which the packet cannot be transmitted due to a collision can be prevented.

Figure 3:
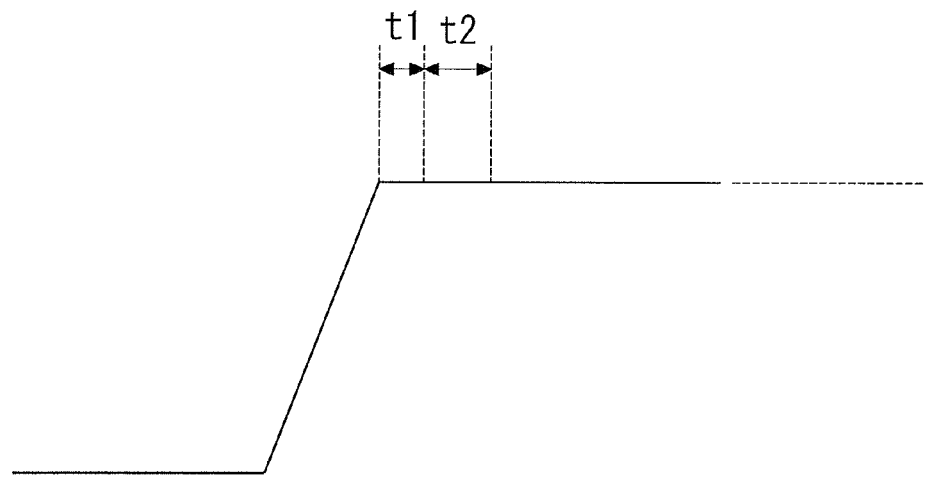
FIG. 3 is a time chart illustrating an operation of the communication device according to the first embodiment.

When the harmonic noise superimposed immediately after the rising and falling edges of the transmission signal Vs has not attenuated sufficiently even after the elapse of a waiting time period t1, the other communication device 1 may be unable to detect the second carrier transmitted during the waiting time period t1 to enable continuous transmission of the untransmitted data, as described above. Therefore, the communication device 1 in which transmission of the untransmitted data is underway transmits the second protocol packet after waiting for the waiting time period t1 to elapse, whereas the communication device 1 that is about to begin transmission of the second protocol packet does not transmit the second protocol packet until a longer time period (t1+t2) than the waiting time period t1 has elapsed, as shown in FIG. 3. Thus, after detecting the second carrier of the packet transmitted by the former communication device 1, the latter communication device 1 waits to transmit its packet, and as a result, a collision can be avoided.

Instead of dividing the transmission data in accordance with the communication suitable periods of the transmission signal Vs such that a plurality of packets are transmitted, as described above, transmission may be performed using the following method. For example, in the time-division multiplexing transmission system according to this embodiment, the transmission signal Vs is continuously transmitted cyclically, and therefore the communication suitable period at the top of the synchronization signal Vs (the period of the start pulse SY) and the communication suitable period at the tail of the synchronization signal SY (the signal return period WT) occur continuously on either side of state variation (the rising and falling edges of the transmission signal Vs). Hence, by transmitting the second protocol packet across a plurality of communication suitable periods occurring continuously on either side of the state variation, the number of divisions of the transmission data can be reduced, enabling an improvement in transmission efficiency. Note, however, that during the state variation period of the transmission signal Vs, the second protocol packet may not be transmitted correctly due to the effects of harmonic noise superimposed onto the transmission signal Vs. Therefore, by transmitting the second protocol packet together with invalid data (dummy data) during a synchronous period with the timing of the state variation in the transmission signal Vs, the volume of data (valid data) that can be transmitted together in a single packet can be increased, and moreover, in comparison with a case in which the transmission data is divided and transmitted in a large number of packets, the number of packets required to transmit the data can be reduced, enabling an improvement in communication efficiency. In other words, the communication efficiency decreases by an amount corresponding to the header and footer included in the second protocol packet, and therefore, by reducing the number of packets, the communication efficiency can be improved by an amount corresponding to the header and footer.

Second Embodiment

Figure 4:
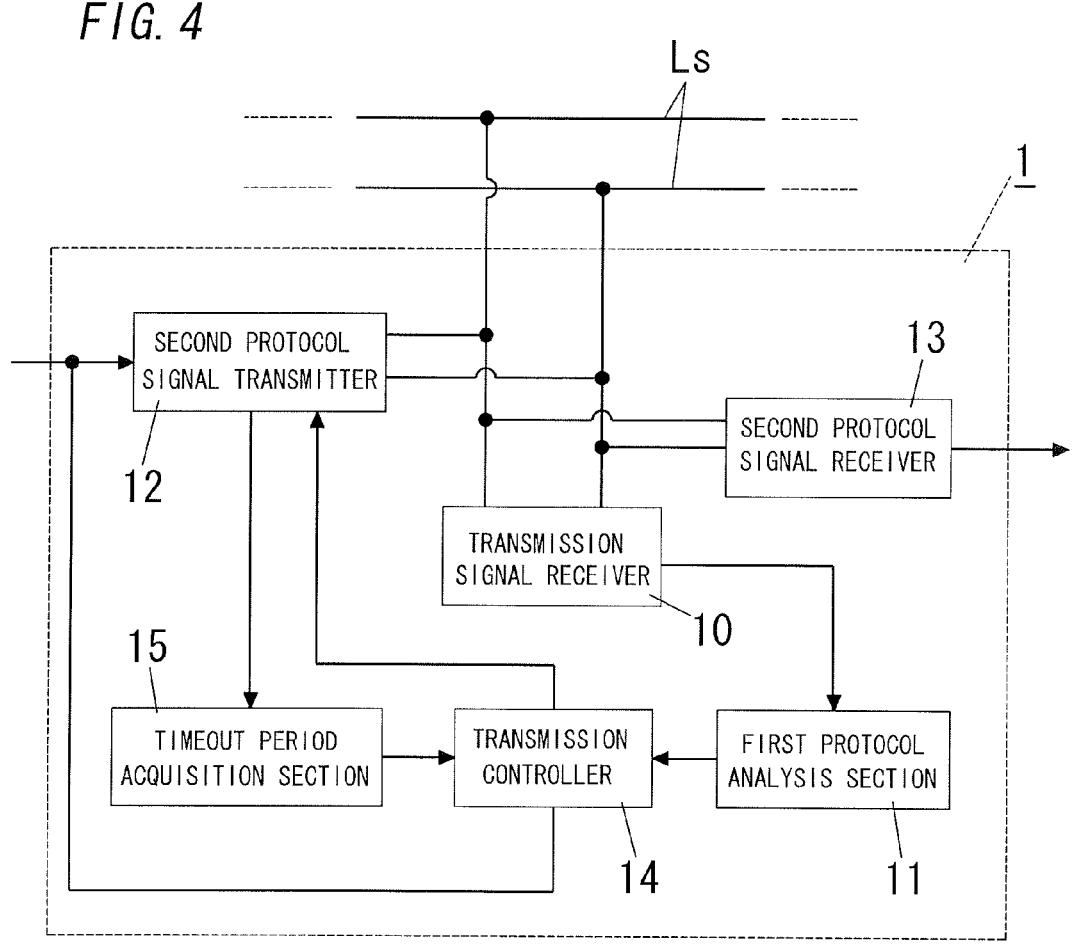
FIG. 4 is a block diagram of a communication device according to a second embodiment.

FIG. 4 is a block diagram showing the communication device 1 according to this embodiment. Note that this communication device 1 shares a basic constitution with the communication device 1 of the first embodiment, and therefore identical reference numerals have been allocated to shared constitutional elements while omitting description thereof where appropriate.

Figure 5:
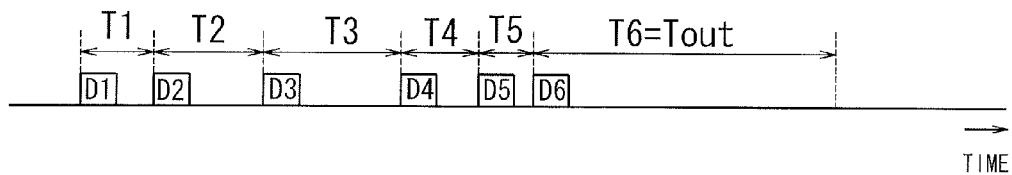
FIG. 5 is a time chart illustrating an operation of the communication device according to the second embodiment.

In the communication system of this embodiment, transmission data obtained by dividing a meaningful block of data (to be referred to hereafter as a message) into a plurality is transmitted from the terminal device 2 to the communication device 1, whereupon the received transmission data is stored sequentially in packets in the communication device 1 and then transmitted. A reception side terminal device 2 receives reception data in sequence from the communication device 1 that received the packets, and then reconstructs the original message. Further, in this communication system, when a time interval between the transmission data input into the communication device 1 from the terminal device 2 and the reception data output to the terminal device 2 from the communication device 1 exceeds a predetermined timeout period, the terminal device 2 determines that the message is complete. For example, when a single message is divided into six sets of data D1 to D6 in the transmission side terminal device 2 and then transmitted to the communication device 1, the respective data sets D1, . . . are transmitted from the terminal device 2 asynchronously, as shown in FIG. 5. When a time interval Tn (n=1, 2, . . . , 6) between the data transmission operations exceeds a prescribed timeout period Tout, the message is assumed to be complete. However, in a case where a second protocol packet is transmitted over a plurality of communication suitable periods straddling a communication unsuitable period, as described in the first embodiment, the time interval between the reception data received from the final packet transmitted before a communication suitable period shifts to a communication unsuitable period and the reception data received from the first packet transmitted after shifting back to a communication suitable period may exceed the timeout period such that the reception side terminal device 2 mistakenly determines that the message is complete when the timeout period is exceeded. When the end of the message is determined mistakenly in this manner, the reception side terminal device 2 destroys the partially received message, which is incomplete, and issues a request to the transmission side terminal device 2 to re-transmit the message (retry). As a result, a reduction in communication efficiency occurs.

Hence, in this embodiment, when packets including data obtained by dividing a single message are transmitted across a plurality of communication suitable periods straddling a communication unsuitable period and it is predicted that a packet transmission interval including the communication unsuitable period will exceed the timeout period for determining the end of the message in the terminal device 2, the transmission controller 14 delays the transmission timing of the final second protocol packet transmitted before the start of the communication unsuitable period, thereby reducing the likelihood that the transmission interval between two packets straddling the communication unsuitable period will exceed the timeout period.

As shown in FIG. 4, the communication device 1 is provided with a timeout period acquisition section 15 that acquires the timeout period of the terminal device 2. The timeout period acquisition section 15 measures a time interval of data Dm (m=1, 2, . . . ) transmitted from the terminal device 2 and input into the second protocol signal transmitter 12. The timeout period acquisition section 15 then compares the measurement value (Tn in FIG. 5) with a reference value, and when the measurement value is larger (longer in terms of time period), the timeout period acquisition section 15 determines a maximum measurement value by setting the measurement value as a new reference value. The timeout period acquisition section 15 then acquires this maximum value as the timeout period Tout of the terminal device 2. Information relating to the timeout period Tout acquired by the timeout period acquisition section 15 is then transmitted to the transmission controller 14.

Figure 6A:
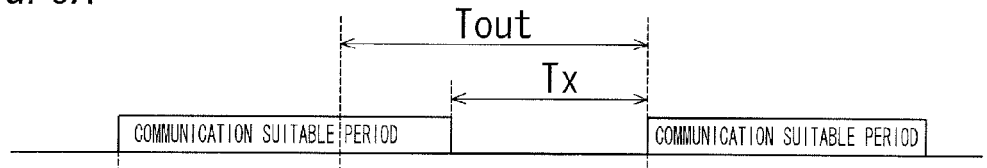
FIG. 6 is a time chart illustrating an operation of the communication device according to the second embodiment.
Figure 6B:
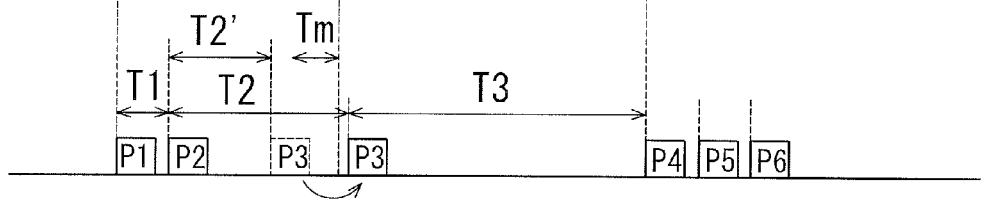

The transmission controller 14 determines a start point and an end point of the communication suitable period from the analysis result of the first protocol analysis section 11. Further, as shown in FIG. 6, the transmission controller 14 determines a start time of the timeout period Tout when the start point of the communication suitable period (the point at which a communication unsuitable period Tx switches to the communication suitable period) is set as a base point, sets the start time of the timeout period Tout as the end point, and sets an equal time to the time required to transmit the packet as a transmission prohibited period Tm. The transmission controller 14 then permits the second protocol signal transmitter 12 to transmit the packet once the transmission prohibited period Tm has elapsed but not during the transmission prohibited period Tm. In other words, in the above example, when the six sets of data D1 to D6 obtained by dividing a single message are stored respectively in six packets P1 to P6 for transmission by the transmission side terminal device 2 but the third packet P3 and the fourth packet P4 must be transmitted on either side of the communication unsuitable period Tx, and it is predicted that the transmission interval between the two packets P3, P4, including the communication unsuitable period Tx, will be longer than the timeout period Tout, the transmission controller 14 makes a transmission interval T3 between the two packets P3, P4 shorter than the timeout period Tout by delaying the transmission timing of the final packet P3 to be transmitted before the start of the communication unsuitable period Tx from T2' to T2.

Figure 7:
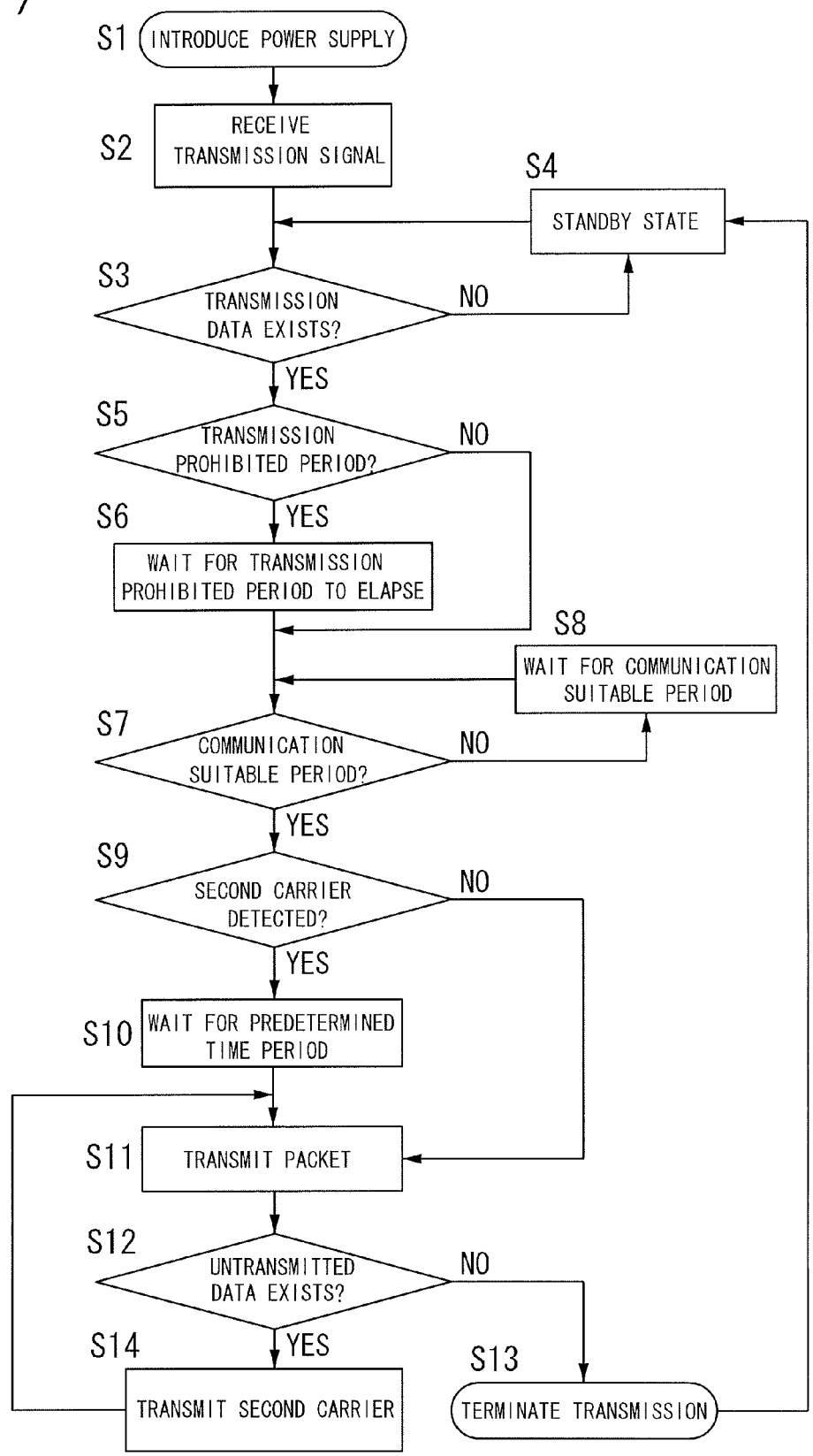
FIG. 7 is a flowchart illustrating an operation of the communication device according to the second embodiment.

Next, referring to a flowchart shown in FIG. 7, an operation of the communication device 1 will be described in detail.

First, when a power supply is introduced such that the communication device 1 is activated (step S1), the transmission signal receiver 10 receives a transmission signal Vs from the signal line Ls (step S2). The transmission controller 14 determines whether or not transmission data input from the terminal device 2 exists (step S3), and when no transmission data exists, the routine enters a standby state in which the transmission signal receiver 10 remains in a receptive condition (step S4). When transmission data exists, on the other hand, the transmission controller 14 determines whether or not the transmission prohibited period Tm is established (step S5), and when the transmission prohibited period Tm is not established, the transmission controller 14 advances immediately to transmission processing (step S7 to step S14). When the transmission prohibited period Tm is established, on the other hand, the transmission controller 14 waits for the transmission prohibited period Tm to elapse before advancing to the transmission processing. Note that the transmission processing of the steps S7 to S14 is identical to the transmission processing (step S5 to step S12) of the first embodiment, shown in the flowchart of FIG. 2, and therefore description has been omitted.

According to the above embodiment, the likelihood that the reception interval between packets in the reception side communication device 1 will exceed the timeout period can be reduced, enabling an improvement in data transmission efficiency.

Third Embodiment

Figure 8:
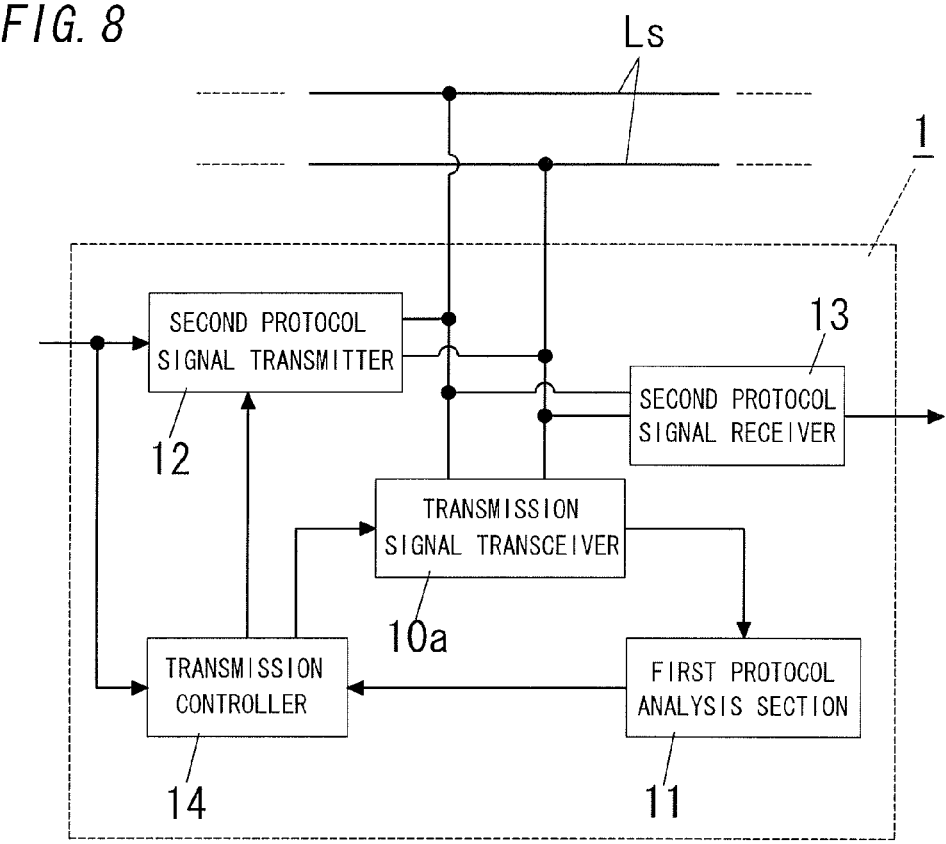
FIG. 8 is a block diagram of a communication device according to a third embodiment.

FIG. 8 is a block diagram showing the communication device 1 according to this embodiment. Note that this communication device 1 shares a basic constitution with the communication device 1 of the first embodiment, and therefore identical reference numerals have been allocated to shared constitutional elements while omitting description thereof where appropriate.

In this embodiment, a transmission signal transceiver 10a is provided in place of the transmission signal receiver 10 according to the first embodiment. The transmission signal transceiver 10a functions not only to receive the first protocol transmission signal Vs from the signal line Ls, but also to transmit a current mode interrupt signal Si by short-circuiting the signal line Ls via an appropriate low impedance.

As described in the related art, when the master (the transmission unit) 21 receives an interrupt signal Si transmitted in synchronization with the start pulse SY of the transmission signal Vs in accordance with the first protocol of the time-division multiplexing transmission system according to this embodiment, the master 21 transmits a transmission signal Vs in which the mode data MD is set to designate the interrupt polling mode, requesting the interrupt signal Si transmitting slave 22 to return its address data in synchronization with the signal return period WT of the transmission signal Vs. Whereby, the master 21 acknowledges the address of the slave 22 which generates the interrupt signal Si.

Hence, when the transmission controller 14 transmits the interrupt signal Si onto the signal line Ls from the transmission signal transceiver 10a in synchronization with the start pulse SY of the transmission signal Vs on the basis of the analysis result of the first protocol analysis section 11, a transmission signal Vs in which the mode data MD is set to the interrupt polling mode is transmitted from the master 21, but since the interrupt signal Si is not actually transmitted by the slave 22 of the time-division multiplexing transmission system, a return signal is not transmitted from the slave 22 during the signal return period WT of the transmission signal Vs, and therefore the entire signal return period WT can be secured as a communication suitable period. Moreover, the signal return period WT occupies a relatively large period in the signal format of the transmission signal Vs, and therefore, by transmitting a signal during this period, a packet having a great data length can be transmitted uninterruptedly.

Here, a signal is not returned from the slaves 22, 23 in the signal return period WT likewise during the polling performed continuously by the master 21, and therefore, when continuous polling is determined to be underway from the analysis result of the first protocol analysis section 11, the transmission controller 14 can transmit a packet during the signal return period WT of the transmission signal Vs.

Fourth Embodiment

In the first to third embodiments, it is assumed that the time-division multiplexing transmission system and the communication system according to the present invention share the signal line Ls, but the time-division multiplexing transmission system may be eliminated such that the communication system according to the present invention is operated alone. For example, the terminal device 2 that communicates using the communication device 1 may be provided with the functions (load monitoring and controlling functions and so on) of the master and slaves of the time-division multiplexing transmission system. However, when the time-division multiplexing transmission system is eliminated and the processing thereof is shifted to the communication system according to the present invention, a large amount of labor and expenditure is incurred during necessary operations to replace the respective communication devices 1.

Figure 9:
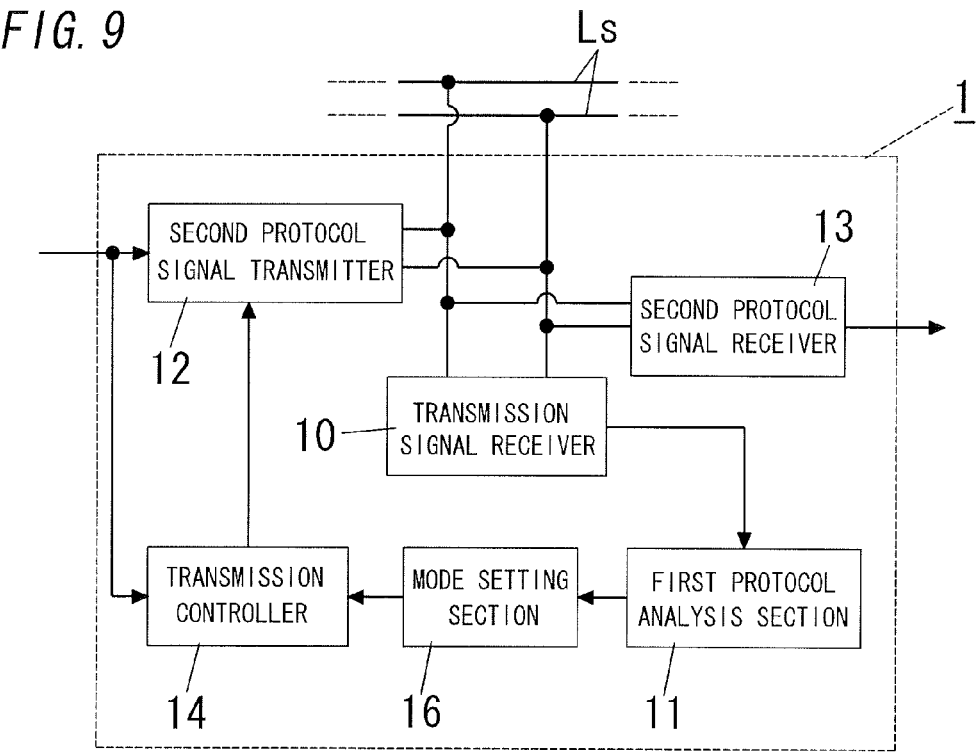
FIG. 9 is a block diagram of a communication device according to a fourth embodiment.

Hence, in this embodiment, as shown in FIG. 9, each communication device 1 is provided with a mode setting section 16 that sets a second protocol exclusive mode when a first protocol transmission signal Vs is not received for at least a predetermined amount of time period. When the second protocol exclusive mode is set by the mode setting section 16, the transmission controller 14 allows the second protocol signal transmitter 12 to transmit a second protocol packet without determining whether or not conditions are suitable for transmitting a second protocol packet, and as a result, the communication system can be shifted automatically to a system for communicating using the second protocol alone without replacing the communication devices 1. Note that this communication device 1 shares a basic constitution with the communication device 1 of the first embodiment, and therefore identical reference numerals have been allocated to shared constitutional elements while omitting description thereof where appropriate.

On the basis of the first protocol analysis result from the first protocol analysis section 11, for example when the first protocol analysis section 11 fails to detect the state of the transmission signal Vs continuously for a time period corresponding at least to between several continuous polling periods and several tens of continuous polling periods, the mode setting section 16 transmits a signal for switching the second protocol exclusive mode ON to the transmission controller 14.

After receiving the ON signal from the mode setting section 16, the transmission controller 14 allows the second protocol signal transmitter 12 to transmit the second protocol packet onto the signal line Ls without determining whether or not the state analyzed by the first protocol analysis section 11 corresponds to a suitable condition for packet transmission according to the second protocol. As will be described below, when the mode setting section 16 transmits a signal for switching the second protocol exclusive mode OFF, the transmission controller 14 determines whether or not the state analyzed by the first protocol analysis section 11 corresponds to a suitable condition for packet transmission according to the second protocol, and only after determining that the condition is suitable for transmission does the transmission controller 14 allow the second protocol signal transmitter 12 to transmit the second protocol packet.

Figure 10:
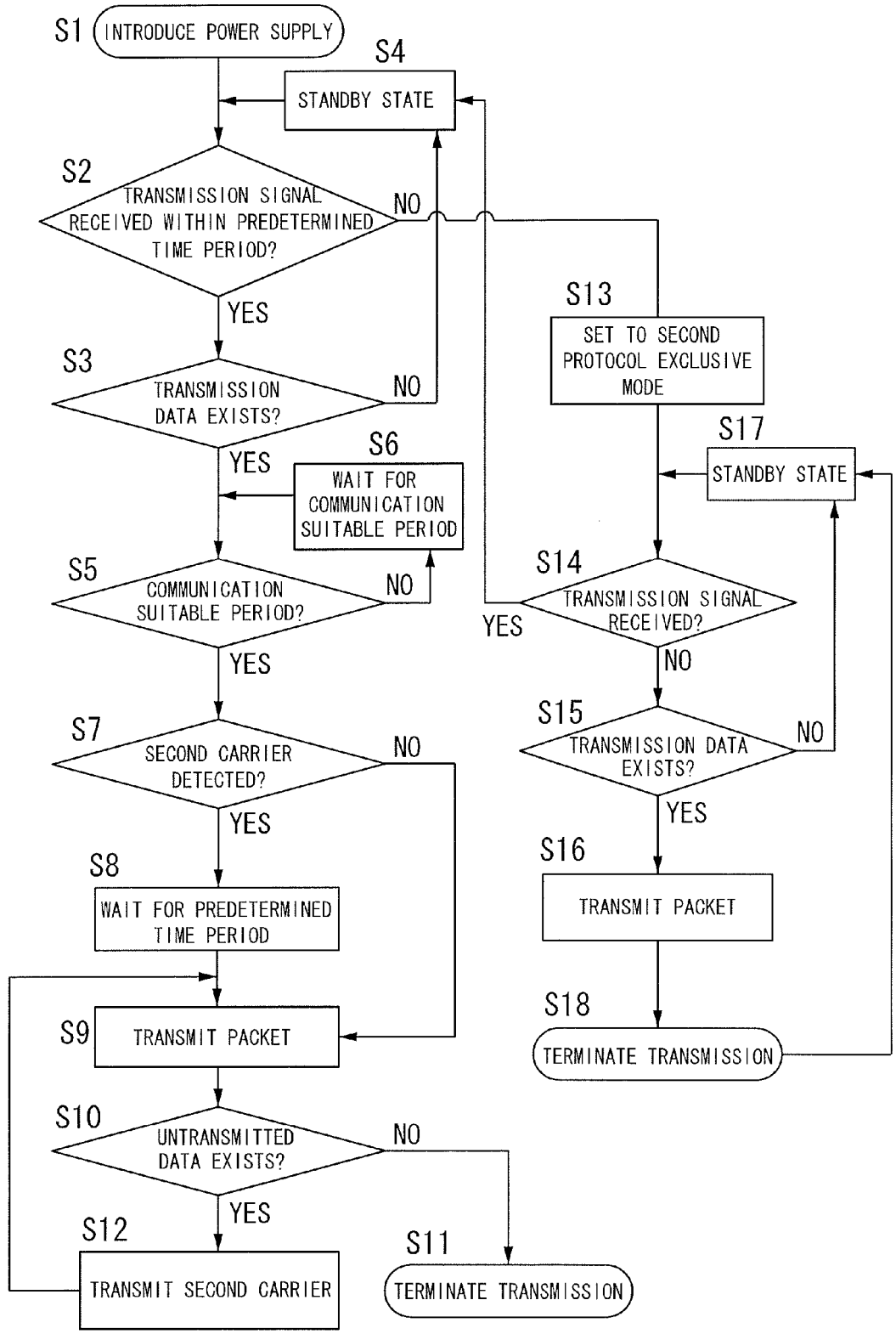
FIG. 10 is a time chart illustrating an operation of the communication device according to the fourth embodiment.
Figure 11:
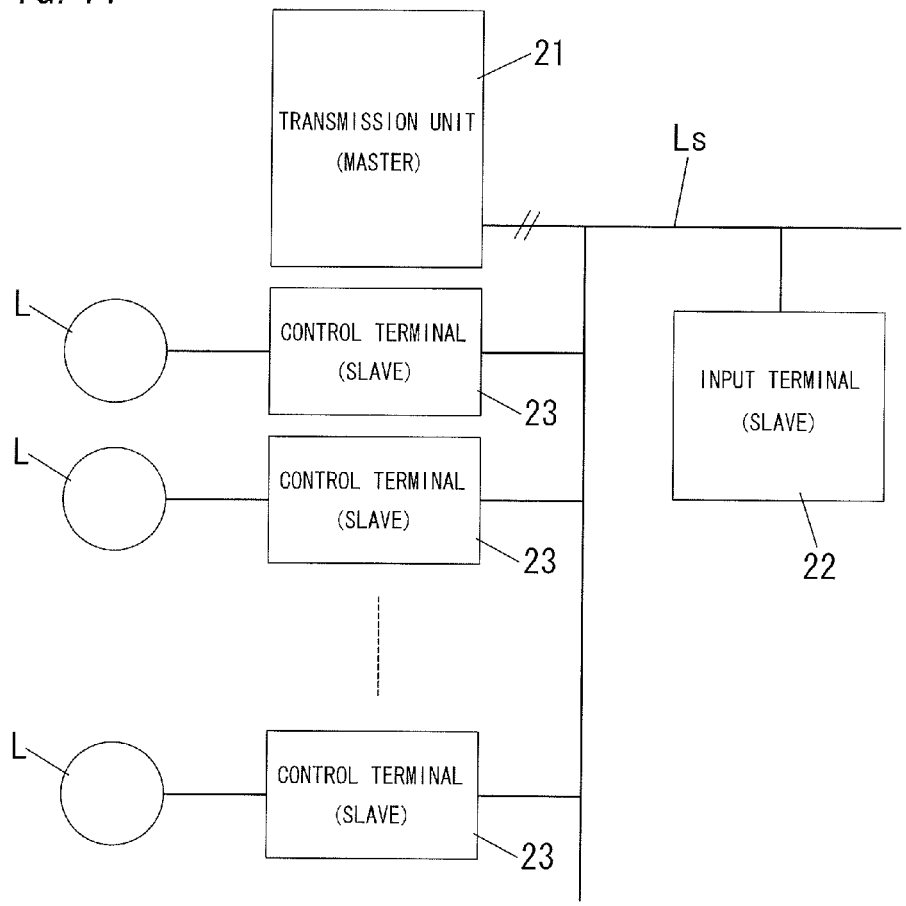
FIG. 11 is a system diagram of a conventional time-division multiplexing transmission system.
Figure 11:
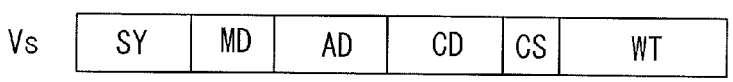
Figure 11:
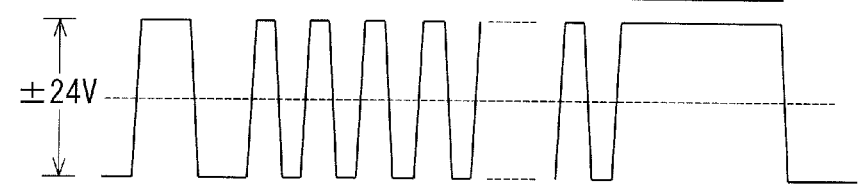
Figure 11:

Next, referring to a flowchart shown in FIG. 10, an operation of the communication device 1 will be described in detail.

First, when a power supply is introduced such that the communication device 1 is activated (step S1), a determination is made in the mode setting unit 16 as to whether or not a transmission signal Vs has been received within a predetermined time period (step S2). When a transmission signal Vs has been received within the predetermined time period, the transmission controller 14 determines whether or not transmission data input from the terminal device 2 exists (step S3), and when no transmission data exists, the routine enters a standby state in which the transmission signal receiver 10 remains in a receptive condition (step S4). When transmission data exists, on the other hand, the transmission signal Vs received by the transmission signal receiver 10 is analyzed by the first protocol analysis section 11, whereupon the transmission controller 14 differentiates between the communication suitable periods and communication unsuitable periods on the basis of the analysis result (step S5). When the transmission controller 14 determines that a communication unsuitable period is established, the routine enters a standby state until a communication suitable period is established (step S6). Note that the transmission processing of steps S7 to S11 is identical to the transmission processing (step S7 to step S11) of the first embodiment, shown in the flowchart of FIG. 2, and therefore description has been omitted.

When a transmission signal Vs is not received within the predetermined time period, on the other hand, the mode setting section 16 transmits a signal for switching the second protocol exclusive mode ON to the transmission controller 14, whereby the transmission controller 14 is set in the second protocol exclusive mode (step S13). The mode setting section 16 continues to determine whether or not the transmission signal Vs has been received on the basis of the analysis result from the first protocol analysis section 11, and when the mode setting section 16 determines that the transmission signal Vs has been received after transmitting the signal for switching the second protocol exclusive mode ON, the mode setting section 16 transmits a signal for switching the second protocol exclusive mode OFF to the transmission controller 14. As a result, the second protocol exclusive mode of the transmission controller 14 is canceled and the routine returns to the standby state of the step S4. In other words, in a case where the second protocol exclusive mode is set when the master 21 of the time-division multiplexing transmission system fails such that the transmission signal Vs is not transmitted onto the signal line Ls, the second protocol exclusive mode must be canceled in the transmission controller 14 of the respective communication devices 1 when the master 21 is restored. Note, however, that this processing is required only when power is supplied to the communication devices 1 using the local power supply method.

The transmission controller 14 set in the second protocol exclusive mode determines whether or not transmission data has been input from the terminal device 2 (step S15), and when no transmission data has been input, the routine enters a standby state in which the transmission signal receiver 10 remains in a receptive condition (step S17). When transmission data exists, on the other hand, the transmission controller 14 permits the second protocol signal transmitter 12 to transmit the second protocol packet onto the signal line Ls without determining whether or not a communication suitable period is established (step S16). Packet transmission in accordance with the second protocol is then terminated (step S18).

According to the above embodiment, when the transmission controller 14 of the communication device 1 is set in the second protocol exclusive mode by the mode setting section 16, the transmission controller 14 allows the second protocol signal transmitter 12 to transmit a second protocol packet without determining whether or not current conditions are suitable for packet transmission according to the second protocol, and therefore the communication system can be shifted automatically to a system for communicating using the second protocol alone without replacing the communication device 1. Note, however, that when power is supplied to the communication device 1 using the concentrated power supply method, a power supply device (not shown) for supplying power to the respective communication devices 1 via the signal line Ls must be added to the communication system in place of the master (the transmission unit) 21 of the time-division multiplexing transmission system.

The invention claimed is:

1. A communication system adapted in use to share a two-wire signal line with a time-division multiplexing transmission system configured to make a data transfer between a master and at least one slave by way of said two-wire signal line in accordance with a first protocol, said communication system comprising:
   a plurality of communication devices connected in parallel with each other to said two-wire signal line,
   each of said communication devices comprising:
   transmission signal receiving means configured to receive a transmission signal transmitted between said master and said slave in accordance with said first protocol in said time-division multiplexing system;
   transmitting means configured to provide a packet to be superimposed on said transmission signal and transmit said packet in accordance with a second protocol different from said first protocol, said packet including data to be transmitted to the other communication device,
   receiving means configured to receive said packet transmitted through said two-wire signal line from the other communication device in accordance with said second protocol;
   first protocol analysis means configured to analyze said transmission signal transmitted in accordance with said first protocol and received at said transmission signal receiving means to give a first protocol data transmission status; and
   control means configured to determine whether or not said first protocol data transmission status analyzed at said first protocol analysis means is available for transmitting said packet in accordance with said second protocol, and permit said transmitting means to transmit said packet when said status is determined to be available, wherein said control means is configured to permit said transmitting means to transmit said packet in accordance with said second protocol after a predetermined waiting time period from a rising or falling edge of said transmission signal composed of a series of pulses.

2. A communication system as set forth in claim 1, wherein said transmitting means is configured to transmit said packet, which is obtained by modulation of a carrier by data, so as to be superimposed on said transmission signal, said receiving means being configured to receive said packet superimposed on said transmission signal, demodulate the data from said packet, and detect whether or not said carrier is superimposed on said transmission signal, said transmitting means being configured to transmit said packet immediately upon non-detection of said carrier at said receiving means and to transmit said packet after a predetermined time period upon detection of said carrier, said control means being configured to permit said transmitting means to transmit the carrier to be superimposed on said transmission signal within said waiting time period until said data transmission by means of said packets using said second protocol is completed.

3. A communication system as set forth in claim 2, wherein said control means is configured to permit said transmitting means to transmit said packet in accordance with said second protocol after an elapse of a second waiting time period which is longer than said waiting time period, until the data transmission in accordance with said second protocol is started.

4. A communication system adapted in use to share a two-wire signal line with a time-division multiplexing transmission system configured to make a data transfer between a master and at least one slave by way of said two-wire signal line in accordance with a first protocol, said communication system comprising:

a plurality of communication devices connected in parallel with each other to said two-wire signal line, each of said communication devices comprising:

transmission signal receiving means configured to receive a transmission signal transmitted between said master and said slave in accordance with said first protocol in said time-division multiplexing system;

transmitting means configured to provide a packet to be superimposed on said transmission signal and transmit said packet in accordance with a second protocol different from said first protocol, said packet including data to be transmitted to the other communication device, receiving means configured to receive said packet transmitted through said two-wire signal line from the other communication device in accordance with said second protocol;

first protocol analysis means configured to analyze said transmission signal transmitted in accordance with said first protocol and received at said transmission signal receiving means to give a first protocol data transmission status; and control means configured to determine whether or not said first protocol data transmission status analyzed at said first protocol analysis means is available for transmitting said packet in accordance with said second protocol, and permit said transmitting means to transmit said packet when said status is determined to be available, wherein said control means is configured to permit said transmitting means to transmit said packet including an invalid data in synchronization with such a timing that the data transmission becomes unavailable for transmission of said packet, in case when the length of said packet is longer than a period available for transmission of said packet in accordance with said second protocol during the data transmission with said first protocol.

5. A communication system adapted in use to share a two-wire signal line with a time-division multiplexing transmission system configured to make a data transfer between a master and at least one slave by way of said two-wire signal line in accordance with a first protocol, said communication system comprising:

a plurality of communication devices connected in parallel with each other to said two-wire signal line, each of said communication devices comprising:

transmission signal receiving means configured to receive a transmission signal transmitted between said master and said slave in accordance with said first protocol in said time-division multiplexing system;

transmitting means configured to provide a packet to be superimposed on said transmission signal and transmit said packet in accordance with a second protocol different from said first protocol, said packet including data to be transmitted to the other communication device, receiving means configured to receive said packet transmitted through said two-wire signal line from the other communication device in accordance with said second protocol;

first protocol analysis means configured to analyze said transmission signal transmitted in accordance with said first protocol and received at said transmission signal receiving means to give a first protocol data transmission status; and control means configured to determine whether or not said first protocol data transmission status analyzed at said first protocol analysis means is available for transmitting said packet in accordance with said second protocol, and permit said transmitting means to transmit said packet when said status is determined to be available, wherein said control means is configured to predict, when said transmitting means transmits consecutively a plurality of said packets corresponding respectively to the data divided from one message, a situation where a period in which the data transmission with said first protocol becomes unavailable for the packet transmission with said second protocol exists between said packets and at the same time a transmission interval including said period becomes longer than a predetermined timeout period, and to delay a timing of transmitting the last packet before thus predicted situation occurs.

6. A communication system adapted in use to share a two-wire signal line with a time-division multiplexing transmission system configured to make a data transfer between a master and at least one slave by way of said two-wire signal line in accordance with a first protocol, said communication system comprising:

a plurality of communication devices connected in parallel with each other to said two-wire signal line, each of said communication devices comprising:

transmission signal receiving means configured to receive a transmission signal transmitted between said master and said slave in accordance with said first protocol in said time-division multiplexing system;

transmitting means configured to provide a packet to be superimposed on said transmission signal and transmit said packet in accordance with a second protocol different from said first protocol, said packet including data to be transmitted to the other communication device, receiving means configured to receive said packet transmitted through said two-wire signal line from the other communication device in accordance with said second protocol;

first protocol analysis means configured to analyze said transmission signal transmitted in accordance with said first protocol and received at said transmission signal receiving means to give a first protocol data transmission status; and control means configured to determine whether or not said first protocol data transmission status analyzed at said first protocol analysis means is available for transmitting said packet in accordance with said second protocol, and permit said transmitting means to transmit said packet when said status is determined to be available, wherein said first protocol is configured to define an interrupt request period in which an interrupt signal of requesting to start the data transmission from the slave to the master is transmitted, and a preference period in which the slave making the interrupt request is preferentially allowed to make the data transmission, said communication device including an interrupt, signal transmission means for transmitting said interrupt signal by way of said two-wire signal line, said control means being configured to cause said interrupt signal transmission means to issue said interrupt signal, and thereafter to cause said transmitting means to transmit said packet in accordance with the second protocol preferentially in said preference period.

7. A communication system adapted in use to share a two-wire signal line with a time-division multiplexing transmission system configured to make a data transfer between a master and at least one slave by way of said two-wire signal line in accordance with a first protocol, said communication system comprising:

a plurality of communication devices connected in parallel with each other to said two-wire signal line, each of said communication devices comprising:

transmission signal receiving means configured to receive a transmission signal transmitted between said master and said slave in accordance with said first protocol in said time-division multiplexing system;

transmitting means configured to provide a packet to be superimposed on said transmission signal and transmit said packet in accordance with a second protocol different from said first protocol, said packet including data to be transmitted to the other communication device, receiving means configured to receive said packet transmitted through said two-wire signal line from the other communication device in accordance with said second protocol first protocol analysis means configured to analyze said transmission signal transmitted in accordance with said first protocol and received at said transmission signal receiving means to give a first protocol data transmission status; and control means configured to determine whether or not said first protocol data transmission status analyzed at said first protocol analysis means is available for transmitting said packet in accordance with said second protocol, and permit said transmitting means to transmit said packet when said status is determined to be available, wherein said first protocol is configured to define a command transmission period in which the master sends a data transmission requesting command for requesting, the slave to transmit the data, and a data transmission period in which the requested slave makes the data transmission in response to said command, said control means being configured to cause said transmitting means to transmit the said packet in accordance with said second protocol when it is determined that no said date transmission requesting command is transmitted during said command transmission period based upon an analysis result made at said first protocol analysis means.

8. A communication system adapted in use to share a two-wire signal line with a time-division multiplexing transmission system configured to make a data transfer between a master and at least one slave by way of said two-wire signal line in accordance with a first protocol, said communication system comprising:

a plurality of communication devices connected in parallel with each other to said two-wire signal line, each of said communication devices comprising:

transmission signal receiving means configured to receive a transmission signal transmitted between said master and said slave in accordance with said first protocol in said time-division multiplexing system;

transmitting means configured to provide a packet to be superimposed on said transmission signal and transmit said packet in accordance with a second protocol different from said first protocol, said packet including data to be transmitted to the other communication device, receiving means configured to receive said packet transmitted through said two-wire signal line from the other communication device in accordance with said second protocol;

first protocol analysis means configured to analyze said transmission signal transmitted in accordance with said first protocol and received at said transmission signal receiving means to give a first protocol data transmission status; and control means configured to determine whether or not said first protocol data transmission status analyzed at said first protocol analysis means is available for transmitting said packet in accordance with said second protocol, and permit said transmitting means to transmit said packet when said status is determined to be available, wherein said communication device includes a mode selector for setting a second protocol exclusive mode when the transmission signal in accordance with said first protocol is not received over a predetermined time period, said control means being configured to permit said transmitting means to transmit said packet without determining whether or not said packet transmission in accordance with said second protocol is available, when said second protocol exclusive mode is selected at said mode selector.

9. A communication method which shares a two-wire signal line with a time-division multiplexing transmission system configured to make a data transfer between a master and at least one slave by way of said two-wire signal line in accordance with a first protocol, said communication method using a plurality or communication devices connected in parallel with each other to said two-wire signal line, and comprising steps of:

receiving a transmission signal transmitted between said master and said slave of said time-division multiplex transmission system in accordance with said first protocol;

analyzing the received transmission signal to give a first protocol data transmission status with regard to said first protocol; and determining whether or not said first protocol data transmission status is available for transmission of a packet in accordance with a second protocol, and transmitting said packet as being superimposed on said transmission signal from one of said communication devices to the other communication device in accordance with said second protocol different from said first protocol when said first protocol data transmission status is determined to be available for transmission of said packet, said packet including data to be transmitted from one of said communication devices to the other one, wherein transmitting said packet in accordance with said second protocol after a predetermined waiting time period from a rising or falling edge of said transmission signal composed of a series of pulses.

10. A communication method which shares a two-wire signal line with a time-division multiplexing transmission system configured to make a data transfer between a master and at least one slave by way of said two-wire signal line in accordance with a first protocol, said communication method using a plurality of communication devices connected in parallel with each other to said two-wire signal line, and comprising steps of:

receiving a transmission signal transmitted between said master and said slave of said time-division multiplex transmission system in accordance with said first protocol;

analyzing the received transmission signal to give a first protocol data transmission status with regard to said first protocol; and determining whether or not said first protocol data transmission status is available for transmission of a packet in accordance with a second protocol, and transmitting said packet as being superimposed on said transmission signal from one of said communication devices to the other communication device in accordance with said second protocol different from said first protocol when said first protocol data transmission status is determined to be available for transmission of said packet, said packet including data to be transmitted from one of said communication devices to the other one, wherein transmitting said packet including an invalid data in synchronization with such a timing that the data transmission becomes unavailable for transmission of said packet, in case when the length of said packet is longer than a period available for transmission of said packet in accordance with said second protocol during the data transmission with said first protocol.

11. A communication method which shares a two-wire signal line with a time-division multiplexing transmission system configured to make a data transfer between a master and at least one slave by way of said two-wire signal line in accordance with a first protocol, said communication method using a plurality of communication devices connected in parallel with each other to said two-wire signal line, and comprising steps of:

receiving a transmission signal transmitted between said master and said slave of said time-division multiplex transmission system in accordance with said first protocol;

analyzing the received transmission signal to give a first protocol data transmission status with regard to said first protocol; and determining whether or not said first protocol data transmission status is available for transmission of a packet in accordance with a second protocol, and transmitting said packet as being superimposed on said transmission signal from one of said communication devices to the other communication device in accordance with said second protocol different from said first protocol when said first protocol data transmission status is determined to be available for transmission of said packet, said packet including data to be transmitted from one of said communication devices to the other one, wherein predicting, when consecutively transmitting a plurality of said packets corresponding respectively to the data divided from one message, a situation where a period in which the data transmission with said first protocol becomes unavailable for the packet transmission with said second protocol exists between said packets and at the same time a transmission interval including said period becomes longer than a predetermined timeout period, and delaying a timing of transmitting the last packet before thus predicted situation occurs.

12. A communication method which shares a two-wire signal line with a time-division multiplexing transmission system configured to make a data transfer between a master and at least one slave by way of said two-wire signal line in accordance with a first protocol, said communication method using a plurality of communication devices connected in parallel with each oilier to said two-wire signal line, and comprising steps of:

receiving a transmission signal transmitted between said master and said slave of said time-division multiplex transmission system in accordance with said first protocol;

analyzing the received transmission signal to give a first protocol data transmission status with regard to said first protocol; and determining whether or not said first protocol data transmission status is available for transmission of a packet in accordance with a second protocol, and transmitting said packet as being superimposed on said transmission signal from one of said communication devices to the other communication device in accordance with said second protocol different from said first protocol when said first protocol data transmission status is determined to be available for transmission of said packet, said packet including data to be transmitted from one of said communication devices to the other one, wherein said first protocol is configured to define an interrupt request period in which an interrupt signal of requesting to start the data transmission from the slave to the master is transmitted, and a preference period in which the slave making the interrupt request is preferentially allowed to make the data transmission, and transmitting said interrupt signal to the master by way of said two-wire signal line, and thereafter transmitting said packet in accordance with the second protocol preferentially in said preference period.

13. A communication method which shares a two-wire signal line with a time-division multiplexing transmission system configured to make a data transfer between a master and at least one slave by way of said two-wire signal line in accordance with a first protocol, said communication method using a plurality of communication devices connected in parallel with each other to said two-wire signal line, and comprising steps of:

receiving a transmission signal transmitted between said master and said slave of said time-division multiplex transmission system in accordance with said first protocol;

analyzing the received transmission signal to give a first protocol data transmission status with regard to said first protocol; and determining whether or not said first protocol data transmission status is available for transmission of a packet in accordance with a second protocol, and transmitting said packet as being superimposed on said transmission signal from one of said communication devices to the other communication device in accordance with said second protocol different from said first protocol when said first protocol data transmission status is determined to be available for transmission of said packet, said packet including data to be transmitted from one of said communication devices to the other one, wherein said first protocol is configured to define a command transmission period in which the master sends a data transmission requesting command for requesting the slave to transmit the data, and a data transmission period in which the requested slave makes the data transmission in response to said command, and transmitting the said packet in accordance with said second protocol when it is determined that no said date transmission requesting command is transmitted during said command transmission period based upon an analysis result of the data transmission status.

14. A communication method which shares a two-wire signal line with a time-division multiplexing transmission system configured to make a data transfer between a master and at least one slave by way of said two-wire signal line in accordance with a first protocol, said communication method using a plurality of communication devices connected in parallel with each other to said two-wire signal line, and comprising steps of:

receiving a transmission signal transmitted between said master and said slave of said time-division multiplex transmission system in accordance with said first protocol;

analyzing the received transmission signal to give a first protocol data transmission status with regard to said first protocol; and determining whether or not said first protocol data transmission status is available for transmission of a packet in accordance with a second protocol, and transmitting said packet as being superimposed on said transmission signal from one of said communication devices to the other communication device in accordance with said second protocol different from said first protocol when said first protocol data transmission status is determined to be available for transmission of said packet, said packet including data to be transmitted from one of said communication devices to the other one, wherein setting a second protocol exclusive mode when the transmission signal in accordance with said first protocol is not received over a predetermined time period, and transmitting said packet without determining whether or not said packet transmission in accordance with said second protocol is available, when said second protocol exclusive mode is selected.

\* \* \* \* \*